US012255059B2

(12) United States Patent
Quint et al.

(10) Patent No.: US 12,255,059 B2
(45) Date of Patent: Mar. 18, 2025

(54) METHOD AND DEVICE FOR MULTIPLE TRANSITION MONITORING

(71) Applicant: Roche Diagnostics Operations, Inc., Indianapolis, IN (US)

(72) Inventors: Stefan Quint, Munich (DE); Florian Schweinberger, Munich (DE); Benjamin Tiemann, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 201 days.

(21) Appl. No.: 17/805,482

(22) Filed: Jun. 6, 2022

(65) Prior Publication Data

US 2022/0319827 A1 Oct. 6, 2022

Related U.S. Application Data

(63) Continuation of application No. PCT/EP2020/086399, filed on Dec. 16, 2020.

(30) Foreign Application Priority Data

Dec. 17, 2019 (EP) .................................... 19216963

(51) Int. Cl.
*H01J 49/42* (2006.01)

(52) U.S. Cl.
CPC ........ *H01J 49/4215* (2013.01); *H01J 49/429* (2013.01)

(58) Field of Classification Search
CPC ........ H01J 49/00; H01J 49/02; H01J 49/4215; H01J 49/429; H01J 49/421; H01J 49/427
(Continued)

(56) References Cited

U.S. PATENT DOCUMENTS 5,089,703 A 2/1992 Schoen et al.
5,227,629 A * 7/1993 Miseki .................. H01J 49/421 250/290

(Continued)

FOREIGN PATENT DOCUMENTS

EP 0938743 B1 10/2003
EP 3425369 A1 1/2019

(Continued)

OTHER PUBLICATIONS

Gross, Jürgen H., Massenspektrometrie, 2012, pp. 162-168, Springer Spektrum, with English translation of 3rd Edition, 2017, pp. 190-197.

(Continued)

*Primary Examiner* — Jason L Mccormack
(74) *Attorney, Agent, or Firm* — Taft Stettinius & Hollister LLP

(57) ABSTRACT

A method for multiple transition monitoring of at least one analyte in a sample using a quadrupole mass analyzer is provided and comprises at least one voltage application step, wherein a direct current (DC) voltage and a radio frequency (AC) voltage are applied between two pairs of electrodes of at least one mass filter of the analyzer, wherein the AC voltage has an amplitude $V_{AC}$ and the DC voltage has an applicable voltage $V_{DC}$, wherein a supplementary AC voltage is superimposed on top of the AC and the DC voltage, wherein an amplitude $\Delta V_{DC}$ of the supplementary AC voltage is $$\leq \frac{V_{DC,max}}{2^{b+1}},$$

wherein $V_{DC,max}$ is a maximum voltage output of the DC voltage and b is a bit size of at least one electronics board (Continued)

of the mass filter of the analyzer; and wherein at least one transition of the analyte is determined with at least one detector of the analyzer.

13 Claims, 4 Drawing Sheets

(58) Field of Classification Search
USPC ........................................ 250/281, 282, 288
See application file for complete search history.

(56) References Cited

U.S. PATENT DOCUMENTS

| | | | | |
|---|---|---|---|---|
| 9,099,286 | B2 | 8/2015 | Brown et al. | |
| 9,263,244 | B2 * | 2/2016 | Green | H01J 49/065 |
| 2003/0001085 | A1 * | 1/2003 | Bateman | H01J 49/005 250/281 |
| 2003/0071206 | A1 * | 4/2003 | Belov | H01J 49/004 250/282 |
| 2012/0305762 | A1 | 12/2012 | Kaneko et al. | |
| 2015/0170896 | A1 * | 6/2015 | Green | H01J 49/065 250/281 |
| 2017/0276645 | A1 * | 9/2017 | Green | H01J 49/004 |

FOREIGN PATENT DOCUMENTS

| | | | | | |
|---|---|---|---|---|---|
| JP | 3404849 | B2 | 3/2003 | | |
| WO | 2012/120300 | A1 | 9/2012 | | |
| WO | WO-2017089991 | A1 | * | 6/2017 | H01J 49/004 |

OTHER PUBLICATIONS

International Search Report issued Feb. 25, 2021 in Application No. PCT/EP2020/086399, 2 pp.

Sheretov, Ernst P. et al., Modulation parametric resonances and their influence on stability diagram structure, International Journal of Mass Spectrometry, 1999, pp. 207-216, vol. 184.

* cited by examiner

METHOD AND DEVICE FOR MULTIPLE TRANSITION MONITORING

CROSS-REFERENCE TO RELATED APPLICATIONS

This application is a continuation of International Patent Application No. PCT/EP2020/086399, filed 16 Dec. 2020, which claims priority to European Patent Application No. 19216963.9, filed 17 Dec. 2019, the disclosures of which are hereby incorporated by reference in their entirety.

TECHNICAL FIELD

The present disclosure relates to a method and a device for multiple transition monitoring using mass spectrometry techniques, specifically liquid chromatography and mass spectrometry.

Quadrupole mass analyzers are known for multiple transition monitoring (MRM) of at least one analyte in a sample. As described, for example, in "Massenspektrometrie" Jurgen H. Gross, Springer Spektrum, DOI 10.1007/978-3-8274-2981-0, pages 162 to 168, as mass filter typically four cylindrical shaped electrode rods are used extending parallel along a z-axis and arranged in a quadratic manner in an xy-plane. Each opposing rod pair is held at identical potential, which is composed of an alternating current (AC) voltage and a direct current (DC) voltage. An attractive force acts on an ion which enter into the quadrupole in z direction from one of the rods having charge opposite to the charge of the ion. Sign of charge of the rods changes periodically. Stable trajectories are only possible for ions within a certain mass-to-charge ratio m/z, whereas all other ions have unstable trajectories. Trajectories of ions can be described by the Mathieu differential equations. The ions having stable trajectories are fed to and measured by a detector. The detector determines a so-called mass spectrum, which is a two dimensional representation of signal intensity vs m/z, wherein the signal intensity corresponds to abundance of the respective ion.

Power supply for the mass filter is typically performed using at least one digital-to-analog converter. Available electric boards of the digital-to-analog converter may limit the resolution of step size in resulting mass spectrometer peaks of the mass spectrum. The step size refers to width of m/z range during detection of ions. In principle, this step size can further be optimized, however, this is expensive and reaches a technical limit. Moreover, when comparing analyte and internal standard peaks, resolution in step size may be significant. The signal relating the analyte and the signal relating to the internal standard might sit on different steps. This can result in large variation of area ratios. This variation can easily happen over time, when the mass axis shifts, e.g., as a result of changes in environmental conditions such as temperature.

It is therefore an objective of the present disclosure to provide a method and a device for multiple transition monitoring, which avoid the above-described disadvantages of known methods and devices. In particular, the method and the device shall improve signal stability for multiple transition monitoring and reliability of area ratios.

SUMMARY

Although the embodiments of the present disclosure are not limited to specific advantages or functionality, it is noted that in accordance with the present disclosure a method and a device for multiple transition monitoring is provided.

In accordance with one embodiment of the present disclosure, a method for multiple transition monitoring of at least one analyte in a sample using a quadrupole mass analyzer is provided, the method comprising the following steps: a) at least one voltage application step, wherein in the voltage application step a direct current (DC) voltage and a radio frequency (AC) voltage are applied between two pairs of electrodes of at least one mass filter of the quadrupole mass analyzer, wherein the AC voltage has an amplitude VAC and the DC voltage has an applicable voltage VDC, wherein a supplementary AC voltage is superimposed on top of the AC and the DC voltage, wherein an amplitude ΔVDC of the supplementary AC voltage is $\leq V_{DC,max}/2^{b+1}$, wherein VDC,max is a maximum voltage output of the DC voltage and b is a bit size of at least one electronics board of the mass filter of the quadrupole mass analyzer, wherein the electronics board is configured for providing the AC and DC voltages to the electrodes of the mass filter, wherein the electronics board comprises at least one digital-to-analog converter; b) at least one measurement step, wherein at least one transition of the analyte is determined with at least one detector of the quadrupole mass analyzer.

In accordance with another embodiment of the present disclosure, a quadrupole mass analyzer for multiple transition monitoring of at least one analyte in a sample is provided comprising: at least one mass filter comprising two pairs of electrodes and at least one detector configured for determining at least one transition of the analyte, wherein the mass filter further comprises at least one electronics board, wherein the electronics board is configured for providing the AC and DC voltages to the electrodes of the mass filter, wherein the electronics board comprises at least one digital-to-analog converter; at least one DC voltage generator configured for generating a direct (DC) voltage and at least one AC voltage generator configured for generating a radio frequency (AC) voltage, wherein the AC voltage has an amplitude VAC and the DC voltage has an applicable voltage VDC; at least one power supply circuitry configured for applying the DC voltage and the AC voltage between the two pairs of electrodes of the mass filter; at least one supplementary AC voltage generator configured for generating a supplementary AC voltage having an amplitude $$\Delta VDC \leq \frac{V_{DC,max}}{2^{b+1}},$$

wherein VDC,max is a maximum voltage output of the DC voltage and b is a bit size of the electronics board of the mass filter of the quadrupole mass analyzer; at least one supplementary power supply circuitry configured for superimposing the supplementary AC voltage on top of the AC and DC voltages.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
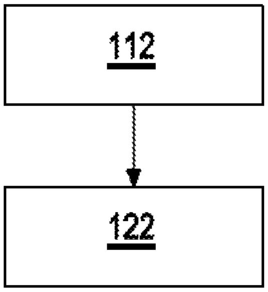
FIG. 1 shows a flow chart of a method according to the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION OF THE DISCLOSURE

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, as used in the following, the terms "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The present disclosure may, as the skilled person will recognize, be performed by using alternative features. Similarly, features introduced by "in an embodiment of the present disclosure" or similar expressions are intended to be optional features, without any restriction regarding alternative embodiments of the present disclosure, without any restrictions regarding the scope of the present disclosure and without any restriction regarding the possibility of combining the features introduced in such way with other optional or non-optional features of the present disclosure.

In a first aspect of the present disclosure, a method for multiple transition monitoring using a quadrupole mass analyzer is disclosed.

The term "multiple transition monitoring", also denoted multiple reaction monitoring (MRM), as used herein is a broad term and is to be given its ordinary and customary meaning to a person of ordinary skill in the art and is not to be limited to a special or customized meaning. The term specifically may refer, without limitation, to a method used in mass spectrometry, specifically in tandem mass spectrometry, in which multiple product ions from one or more precursor ions are monitored. As used herein, the term "monitored" is a broad term and is to be given its ordinary and customary meaning to a person of ordinary skill in the art and is not to be limited to a special or customized meaning. The term specifically may refer, without limitation, to determining and/or detecting of multiple product ions.

As used herein, the term "mass analyzer", also denoted "mass spectrometry device", is a broad term and is to be given its ordinary and customary meaning to a person of ordinary skill in the art and is not to be limited to a special or customized meaning. The term specifically may refer, without limitation, to an analyzer configured for detecting at least one analyte based on mass-to-charge ratio. As used herein, the term "quadrupole mass analyzer" is a broad term and is to be given its ordinary and customary meaning to a person of ordinary skill in the art and is not to be limited to a special or customized meaning. The term specifically may refer, without limitation, to a mass analyzer comprising at least one quadrupole as mass filter. The quadrupole mass analyzer may comprise a plurality of quadrupoles. For example, the quadrupole mass analyzer may be a triple quadrupole mass spectrometer. As used herein, the term "mass filter" is a broad term and is to be given its ordinary and customary meaning to a person of ordinary skill in the art and is not to be limited to a special or customized meaning. The term specifically may refer, without limitation, to a device configured for selecting ions injected to the mass filter according to their mass-to-charge ratio m/z. The mass filter comprises two pairs of electrodes. The electrodes may be rod-shaped, in particular cylindrical. In ideal case, the electrodes may be hyperbolic. The electrodes may be designed identical. The electrodes may be arranged in parallel extending along a common axis, e.g., a z axis. The quadrupole mass analyzer comprises at least one power supply circuitry configured for applying at least one direct current (DC) voltage and at least one alternating current (AC) voltage between the two pairs of electrodes of the mass filter. The power supply circuitry may be configured for holding each opposing electrode pair at identical potential. The power supply circuitry may be configured for changing sign of charge of the electrode pairs periodically such that stable trajectories are only possible for ions within a certain mass-to-charge ratio m/z. Trajectories of ions within the mass filter can be described by the Mathieu differential equations. For measuring ions of different m/z values DC and AC voltage may be changed in time, in particular at a ratio $$\frac{V_{DC}}{V_{AC}} = a,$$

such that ions with different m/z values can be transmitted to the detector.

The quadrupole mass analyzer may further comprise at least one ionization source. As used herein, the term "ionization source", also denoted as "ion source", is a broad term and is to be given its ordinary and customary meaning to a person of ordinary skill in the art and is not to be limited to a special or customized meaning. The term specifically may refer, without limitation, to a device configured for generating ions, e.g., from neutral gas molecules. The ionization source may be or may comprise at least one source selected from the group consisting of: at least one gas phase ionization source such as at least one electron impact (EI) source or at least one chemical ionization (CI) source; at least one desorption ionization source such as at least one plasma desorption (PDMS) source, at least one fast atom bombardment (FAB) source, at least one secondary ion mass spectrometry (SIMS) source, at least one laser desorption (LDMS) source, and at least one matrix assisted laser desorption (MALDI) source; at least one spray ionization source such as at least one thermospray (TSP) source, at least one atmospheric pressure chemical ionization (APCI) source, at least one electrospray (ESI), and at least one atmospheric pressure ionization (API) source.

The quadrupole mass analyzer comprises at least one detector. As used herein, the term "detector", is a broad term and is to be given its ordinary and customary meaning to a person of ordinary skill in the art and is not to be limited to a special or customized meaning. The term specifically may refer, without limitation, to an apparatus configured for detecting incoming ions. The detector may be configured for detecting charged particles. The detector may be or may comprise at least one electron multiplier. The detector and/or at least one evaluation device of the quadrupole mass analyzer may be configured to determining at least one mass spectrum of the detected ions. As used herein, the term "mass spectrum" is a broad term and is to be given its ordinary and customary meaning to a person of ordinary skill in the art and is not to be limited to a special or customized meaning. The term specifically may refer, without limitation, to a two dimensional representation of signal intensity vs the charge-to-mass ratio m/z, wherein the signal intensity corresponds to abundance of the respective ion. The mass spectrum may be a pixelated image. For determining resulting intensities of pixels of the mass spectrum, signals detected with the detector within a certain m/z range may be integrated. The analyte in the sample may be identified by the at least one evaluation device. Specifically, the evaluation device may be configured for correlating known masses to the identified masses or through a characteristic fragmentation pattern.

The quadrupole mass analyzer may be or may comprise a liquid chromatography mass spectrometry device. The quadrupole mass analyzer may be connected to and/or may comprise at least one liquid chromatograph. The liquid chromatograph may be used as sample preparation for the quadrupole mass analyzer. Other embodiments of sample preparation may be possible, such as at least one gas chromatograph. As used herein, the term "liquid chromatography mass spectrometry device" is a broad term and is to be given its ordinary and customary meaning to a person of ordinary skill in the art and is not to be limited to a special or customized meaning. The term specifically may refer, without limitation, to a combination of liquid chromatography with mass spectrometry. The quadrupole mass analyzer may comprise at least one liquid chromatograph. The liquid chromatography mass spectrometry device may be or may comprise at least one high-performance liquid chromatography (HPLC) device or at least one micro liquid chromatography (μLC) device. The liquid chromatography mass spectrometry device may comprise a liquid chromatography (LC) device and a mass spectrometry (MS) device, in the present case the mass filter, wherein the LC device and the mass filter are coupled via at least one interface. The interface coupling the LC device and the MS device may comprise the ionization source configured for generating of molecular ions and for transferring of the molecular ions into the gas phase. The interface may further comprise at least one ion mobility module arranged between the ionization source and the mass filter. For example, the ion mobility module may be a high-field asymmetric waveform ion mobility spectrometry (FAIMS) module.

As used herein, the term "liquid chromatography (LC) device" is a broad term and is to be given its ordinary and customary meaning to a person of ordinary skill in the art and is not to be limited to a special or customized meaning. The term specifically may refer, without limitation, to an analytical module configured to separate one or more analytes of interest of a sample from other components of the sample for detection of the one or more analytes with the mass spectrometry device. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analytes of interest. The liquid chromatography mass spectrometry device may further comprise a sample preparation station for the automated pre-treatment and preparation of samples each comprising at least one analyte of interest.

As used herein, the term "sample" is a broad term and is to be given its ordinary and customary meaning to a person of ordinary skill in the art and is not to be limited to a special or customized meaning. The term specifically may refer, without limitation, to an arbitrary test sample such as a biological sample and/or an internal standard sample. The sample may comprise one or more analytes of interest. For example, the test sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. For example, the sample may be pretreated by adding an internal standard and/or by being diluted with another solution and/or by having being mixed with reagents or the like. For example, analytes of interest may be vitamin D, drugs of abuse, therapeutic drugs, hormones, and metabolites in general. The internal standard sample may be a sample comprising at least one internal standard substance with a known concentration. For further details with respect to the sample, reference is made e.g., to EP 3 425 369 A1, the full disclosure is included herewith by reference. Other analytes of interest are possible.

The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises the following steps:

a) at least one voltage application step, wherein in the voltage application step a direct current (DC) voltage and a radio frequency (AC) voltage are applied between two pairs of electrodes of at least one mass filter of the quadrupole mass analyzer, wherein the AC voltage has an amplitude $V_{AC}$ and the DC voltage has an applicable voltage $V_{DC}$, wherein a supplementary AC voltage is superimposed on top of the AC and the DC voltage, wherein an amplitude $\Delta V_{DC}$ of the supplementary AC voltage is $$\leq \frac{V_{DC,max}}{2^{b+1}},$$

wherein $V_{DC,max}$ is a maximum voltage output of the DC voltage and b is a bit size of at least one electronics board of the mass filter of the quadrupole mass analyzer;

b) at least one measurement step, wherein at least one transition of the analyte is determined with at least one detector of the quadrupole mass analyzer.

As used herein, the term "DC voltage" is a broad term and is to be given its ordinary and customary meaning to a person of ordinary skill in the art and is not to be limited to a special or customized meaning. The term specifically may refer, without limitation, to a component of the potential applied to the pair of electrodes which is within a measurement time of a certain m/z value essentially time independent. As used herein, the term "essentially time independent" refers to completely time independent voltage within the measurement time of a certain m/z value, wherein deviations 1%, typically 0.5%, are possible. For example, the DC voltage may have deviations from a time independent development from 0.1% to 0.2%. As used herein, the term "AC voltage" is a broad term and is to be given its ordinary and customary meaning to a person of ordinary skill in the art and is not to be limited to a special or customized meaning. The term specifically may refer, without limitation, to a component of the potential applied to the pair of electrodes periodically changing direction. The AC voltage has an amplitude $V_{AC}$ and the DC voltage has an applicable voltage $V_{DC}$ which are applied to the electrodes of the quadrupole. The amplitude of the AC voltage $V_{AC}$ can be described as $$V_{AC} = V_{AC,max}\frac{m}{z} + c_{AC},$$

wherein $V_{AC,max}$ is a maximum amplitude of the AC voltage which is applied by the AC voltage generator to the electrodes of the mass filter, $c_{AC}$ is a constant and m/z is the mass-to-charge ratio. The AC signal may be a radio frequency signal having a frequency in a range from 3 kHz to 300 GHz. The applicable voltage $V_{DC}$ can be described as $$V_{DC} = V_{DC,max}\frac{m}{z} + c_{DC},$$

wherein $V_{DC,max}$ is a maximum voltage of the DC voltage, $c_{DC}$ is a constant and m/z is the mass-to-charge ratio. The term "applicable voltage $V_{DC}$" may refer to voltage which can be supplied and/or provided to the electrodes of the mass filter. With respect to further embodiments of the AC and DC voltage applied to the electrodes, reference is made to U.S. Pat. No. 5,227,629 the content of which is included by reference herewith.

As used herein, the term "supplementary AC voltage" is a broad term and is to be given its ordinary and customary meaning to a person of ordinary skill in the art and is not to be limited to a special or customized meaning. The term specifically may refer, without limitation, to an additional AC voltage applied on top of both of the DC and AC voltages. Generally, it is known that a further AC voltage in addition to AC and DC components has certain effects on a measurement with a quadrupole mass spectrometer or a quadrupole mass filter. For example, U.S. Pat. No. 5,227,629 A describes using a small AC voltage in addition to AC and DC components of the quadrupole, in particular in order to avoid or compensate for manufacturing tolerances. Moreover, it is described therein that this additional small AC voltage may result in instable trajectories of ions. However, the present disclosure proposes using a supplementary AC voltage in order to enhance robustness against drifts and/or shifts of mass axis, in particular for multiple transition monitoring.

With respect to embodiments of the supplementary AC voltage, reference is made to U.S. Pat. No. 5,227,629 A the content of which is included by reference herewith.

The supplementary AC voltage may be a triangular signal or a sinusoidal signal. As used herein, the term "triangular signal" refers to a completely triangular signal wherein rounding or curving of the triangular signal peaks due to non-ideal electronics are possible. In case of applying a triangular supplementary AC voltage all resulting data points of the mass spectrum may have identical weights. However, applying a sinusoidal signal may introduce weighting of data points. In order to compensate for this effect, the method may comprise applying a pre-determined and/or a pre-defined weighting to the supplementary AC voltage and/or a weighting of measurement data.

The supplementary AC voltage may have a frequency different from frequency of the AC voltage. The supplementary AC voltage may have a frequency v of $$v = \frac{n}{t_d},$$

wherein n is the number of repetitions and $t_d$ is the dwell time. As used herein, the term "dwell time" is a broad term and is to be given its ordinary and customary meaning to a person of ordinary skill in the art and is not to be limited to a special or customized meaning. The term specifically may refer, without limitation, to a duration in which each m/z ion signal is detected. For example, the dwell time may refer to a time range in which the mass filter remains in a certain configuration and/or setting. For example, for typical dwell times of 2 ms at least 30 repetitions may be used resulting in a frequency v of 15 kHz.

The supplementary AC voltage may be a small wave, i.e., having small amplitude compared to the amplitude of the AC voltage. It was surprisingly found that superimposing a small wave on top of the AC and DC voltages the measured data gets smoothed, in particular averaged, during the measurement and thus less dependent on the step size. For example, well controlled small fluctuations are applied by the supplementary AC voltage. The electronics board of the mass filter may be configured for providing the AC and DC voltages to the mass filter, such as to the electrodes of the mass filter. As used herein, the term "electronics board of the mass filter" is a broad term and is to be given its ordinary and customary meaning to a person of ordinary skill in the art and is not to be limited to a special or customized meaning. The term specifically may refer, without limitation, to a device comprising and/or mechanically supporting at least one electronic component. The electronics board may comprise, for example, at least one printed circuit board on which the at least one electronic component is arranged. The electronics board may comprise at least one digital-to-analog converter. The digital-to-analog converter may be configured for converting a continuously applied voltage signal such as from a power supply, e.g., from AC and DC voltage generators, into at least one discrete voltage signal. For measuring ions of different m/z values DC and AC voltage values may be adjusted over time such that ions with different m/z values can be transmitted to the detector. For operating the mass filter the AC and DC voltages may be adjusted such that the mass filter is passable or open for the desired mass. The selectable masses cannot be selected continuously but only in discrete steps since the digital-to-analog converter may divide the voltage range in b discrete steps, wherein b is also denoted as bit size. In particular, the bit size may refer to the total number of bits. This has the effect that the observable mass range is divided in b steps, too, wherein the greater the number of steps of the digital-to-analog converter the finer the m/z-steps in the mass range. For a given voltage a certain mass can be filtered, in particular selected, by the mass filter and is transmitted to the detector. The detector may determine intensity, in particular frequency, of the impinging ions. Detected intensity may depend on the dwell time and difference between real mass of the ion and filtered mass. The filtered mass may be displaced in particular due to variations in temperature. Because of the discretization of the mass filter the displacement may not be visible as a continuous change but as a jump in intensity. The supplementary AC voltage may have a maximal amplitude of the range of a width of a bin of the mass spectrum. The amplitude $\Delta V_{Dc}$ of the supplementary AC voltage is $$\leq \frac{V_{DC,max}}{2^{b+1}},$$

wherein $V_{DC,max}$ is a maximum voltage output of the DC voltage and b is the bit size of the electronics board of the mass filter of the quadrupole mass analyzer. As used herein, the term “bit size” is a broad term and is to be given its ordinary and customary meaning to a person of ordinary skill in the art and is not to be limited to a special or customized meaning. The term specifically may refer, without limitation, to the number of bits provided by the digital-to-analog converter. As outlined above, because of the discretization of the mass filter the displacement of the filtered mass may be observable as a jump in intensity. It was surprisingly found that a smoothing effect can be achieved in case the amplitude of the supplementary AC voltage is below a bin size of the mass filter. As used herein, the term “bin width” Δ(m/z), also denoted as “bin size”, is a broad term and is to be given its ordinary and customary meaning to a person of ordinary skill in the art and is not to be limited to a special or customized meaning. The term specifically may refer, without limitation, to a resolution limit at which m/z values can be adjusted. For determining resulting intensities of pixels of the mass spectrum, detected signals within a certain m/z range may be integrated. Intensity values of signals may be added up for a pixel of the mass spectrum if they belong to the same bin. The bin width may depend or may be selected depending on the number of bits that are available to discretize the total mass range. The bin width Δ(m/z) may be defined by $$\Delta\left(\frac{m}{z}\right) = \frac{\text{mass range}}{2^b},$$

wherein the mass range is the possible mass range, in particular total mass range, for the applied DC voltage and b is the bit size of the electronics board of the mass filter of the quadrupole mass analyzer. The amplitude of the supplementary AC voltage may be $$\Delta V_{DC} \leq \frac{V_{DC,max}}{\text{mass range}} \frac{\frac{\Delta m}{z}}{2} = \frac{V_{DC,max}}{\text{mass range}} \frac{\text{mass range}}{2^{b+1}} = \frac{V_{DC,max}}{2^{b+1}}.$$

The AC voltage superimposed with the supplementary AC voltage may be $$V_{AC} = V_{AC,max}\frac{m}{z} + c_{AC} + \Delta V_{DC}\cos(2\pi v),$$

wherein $V_{AC,max}$ is a maximum amplitude of the AC voltage, $c_{AC}$ is a constant and m/z is the mass to charge ratio. The DC voltage superimposed with the supplementary AC voltage may be $$V_{DC} = a\left(V_{AC,max}\frac{m}{z} + c_{AC} + \Delta V_{DC}\cos(2\pi v)\right),$$

wherein a is a constant with $$\frac{V_{DC}}{V_{AC}} = a$$

(Matthieu equation), $V_{AC,max}$ is the maximum amplitude of the AC voltage, $c_{AC}$ is a constant and m/z is the mass-to-charge ratio.

Superimposing the supplementary AC voltage on top of the DC voltages may result in that the quadrupole mass analyzer gets less prone to small fluctuations such as by slight variation of electronics or the mass axis. Measuring MRMs with the method according to the present disclosure may reduce errors yielding in more stable and/or reliable area and/or area ratios. Compared to the implementation of better resolving electronics the proposed solution can be implemented rather cost-effective and simple. As will be outlined in more detail below, the method may be implemented using additional components which can be turned off if necessary, for example for a full scan mode. The proposed method can be used during measurement and thus is time neutral and universally applicable for all MRMs.

The method comprises the at least one measurement step, wherein at least one transition of the analyte is determined with the detector of the quadrupole mass analyzer. The measurement step may be triggered by a user, e.g., by entering at least one input to at least one human-machine-interface of the quadrupole mass analyzer. The method may comprise detecting the ions having passed the mass filter with the detector. The method may comprise evaluating data recorded with the detector. The evaluating may comprise determining the mass spectrum. The evaluating may comprise identifying the analyte, such as by correlating known masses to the identified masses or through a characteristic fragmentation pattern. The evaluation may be performed using the at least one evaluation device. The evaluating may comprise performing at least one data analysis comprising performing at least one peak finding algorithm and/or performing at least one peak fitting algorithm. The evaluating may comprise one or more of preprocessing, smoothening, background reduction or removal, peak detection, peak integration.

The method steps a) and b) may be performed by using at least one computer. Specifically, controlling of the voltage application in step a) may be performed fully automatically. Moreover, data acquisition and evaluation in step b) may be performed fully automatically. The method specifically may fully or partially be computer-implemented, specifically on a computer of the quadrupole mass analyzer, such as a processor.

In a further aspect, a computer program including computer-executable instructions for performing the method according to any one of the embodiments as described herein is disclosed, specifically method steps a) and b), when the program is executed on a computer or computer network, specifically a processor of the quadrupole mass analyzer for multiple transition monitoring.

Thus, generally speaking, disclosed and proposed herein is a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one or even all of the method steps as indicated above may be performed by using a computer or a computer network, typically by using a computer program. The computer specifically may be fully or partially integrated into the quadrupole mass analyzer, and the computer programs specifically may be embodied as a software. Alternatively, however, at least part of the computer may also be located outside the quadrupole mass analyzer.

Further disclosed and proposed herein is a computer program product having program code means, in order to perform the method according to the present disclosure in one or more of the embodiments enclosed herein when the program is executed on a computer or computer network, e.g., one or more of the method steps mentioned above. Specifically, the program code means may be stored on a computer-readable data carrier.

Further disclosed and proposed herein is a data carrier having a data structure stored thereon, which, after loading into a computer or computer network, such as into a working memory or main memory of the computer or computer network, may execute the method according to one or more of the embodiments disclosed herein, specifically one or more of the method steps mentioned above.

Further disclosed and proposed herein is a computer program product with program code means stored on a machine-readable carrier, in order to perform the method according to one or more of the embodiments disclosed herein, when the program is executed on a computer or computer network, specifically one or more of the method steps mentioned above. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the method according to one or more of the embodiments disclosed herein, specifically one or more of the method steps mentioned above.

Specifically, further disclosed herein are:

- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the method according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

In a further aspect of the present disclosure, a quadrupole mass analyzer for multiple transition monitoring of at least one analyte in a sample is disclosed.

The quadrupole mass analyzer comprises:

- at least one mass filter comprising two pairs of electrodes and at least detector configured for determining at least one transition of the analyte, wherein the mass filter further comprises at least one electronics board;
- at least one DC voltage generator configured for generating a direct (DC) voltage and at least one AC voltage generator configured for generating a radio frequency (AC) voltage, wherein the AC voltage has an amplitude $V_{AC}$ and the DC voltage has an applicable voltage $V_{DC}$;
- at least one power supply circuitry configured for applying the DC voltage and the AC voltage between the two pairs of electrodes of the mass filter;
- at least one supplementary AC voltage generator configured for generating a supplementary AC voltage having an amplitude $$\Delta V_{DC} \leq \frac{V_{DC,max}}{2^{b+1}},$$

wherein $V_{DC,max}$ is a maximum voltage output of the DC voltage and b is a bit size of the electronics board of the mass filter of the quadrupole mass analyzer;

- at least one supplementary power supply circuitry configured for superimposing the supplementary AC voltage on top of the AC and DC voltages.

The quadrupole mass analyzer may be configured to perform the method according to any one of the preceding embodiments. For most of the terms used herein, possible definitions and embodiments, reference may be made to the description of the method above.

As used herein, the term "DC voltage generator" is a broad term and is to be given its ordinary and customary meaning to a person of ordinary skill in the art and is not to be limited to a special or customized meaning. The term specifically may refer, without limitation, to an electronic device configured to generate at least one DC voltage signal. The DC voltage generator may be configured to adapt the DC voltage signal depending on the m/z range which shall be measured. As used herein, the term "AC voltage generator" is a broad term and is to be given its ordinary and customary meaning to a person of ordinary skill in the art and is not to be limited to a special or customized meaning. The term specifically may refer, without limitation, to an electronic device configured to generate at least one AC voltage signal. The AC voltage generator may comprise at least one frequency generator.

As used herein, the term "power supply circuitry" is a broad term and is to be given its ordinary and customary meaning to a person of ordinary skill in the art and is not to be limited to a special or customized meaning. The term specifically may refer, without limitation, to at least one electronic circuit connecting the DC voltage generator and the AC voltage generator to the electrode pair of the mass filter. The power supply circuitry may comprise a plurality of power lines and/or further electrical devices and components.

The mass filter comprises the at least one electronics board. The electronics board may be configured for providing the AC and DC voltages to the mass filter, such as to the electrodes of the mass filter. The electronics board may comprise at least one digital-to-analog converter. The digital-to-analog converter may be configured for converting a continuously applied voltage from the AC voltage generator and/or DC voltage generator and/or the supplementary AC voltage generator into at least one discrete voltage signal.

As used herein, the term "supplementary AC voltage generator" is a broad term and is to be given its ordinary and customary meaning to a person of ordinary skill in the art and is not to be limited to a special or customized meaning. The term specifically may refer, without limitation, to at least one electronic device configured to generate the supplementary AC voltage signal. The superimposing of the AC and DC voltages with the supplementary AC voltage is performed by using the at least one supplementary power supply circuitry. As used herein, the term "supplementary power supply circuitry" is a broad term and is to be given its ordinary and customary meaning to a person of ordinary skill in the art and is not to be limited to a special or customized meaning. The term specifically may refer, without limitation, to at least one electronic circuitry configured for superimposing the AC and DC voltages with the supplementary AC voltage. The supplementary power supply circuitry may be electrically connected with the power supply circuitry.

The supplementary AC voltage may be superimposed on top of the AC and DC voltages by feeding the supplementary AC voltage into the power supply circuitry before applying the DC voltage and AC voltage to the electrodes of the mass filter. The supplementary AC voltage may be superimposed on top of the AC and DC voltages by feeding the AC and DC voltages together with the supplementary AC voltage into the power supply circuitry. For example, the supplementary AC voltage generator may be embodied integral to one or both of the AC and DC voltage generators. For example, the quadrupole mass analyzer may comprise two supplementary AC voltage generators. For example, one of the supplementary AC voltage generators may be embodied integral to the AC voltage generator and the other one may be embodied to the DC voltage generator. In case the supplementary AC voltage generator is embodied integral to one or both of the AC and DC voltage generators, the AC and/or DC voltage signal may be superimposed directly during or after generation with the supplementary AC voltage and may be fed together within the power supply circuitry.

The superimposing may be embodied capacitive, resulting in a sinusoidal signal, or by using at least one operational amplifier, resulting in a triangular wave. The supplementary power supply circuitry may comprise one or more of at least one capacitor, at least one operational amplifier. The supplementary power supply circuitry may be implemented using electronic components in addition to existing and known power supply circuitry for quadrupole mass analyzers. These additional components can be turned off if necessary, for example for a full scan mode.

The quadrupole mass analyzer may comprise at least one control unit configured for controlling one or more of the DC voltage, the AC voltage, and the supplementary AC voltage. As used herein, the term "control unit" is a broad term and is to be given its ordinary and customary meaning to a person of ordinary skill in the art and is not to be limited to a special or customized meaning. The term specifically may refer, without limitation, to an electronic and/or logic unit configured to control operation of the one or more of the DC voltage, the AC voltage, and the supplementary AC voltage, in particular output signals of one or more of the AC, the DC and supplementary AC voltage generators and/or power supply circuitry and/or supplementary power supply circuitry.

The quadrupole mass analyzer may comprise the at least one evaluation device configured for evaluating at least one detector signal of the detector for determining the transition of the analyte. As used herein, the term "evaluation device" generally refers to an arbitrary device adapted to perform the method steps as described above, typically by using at least one data processing device and, more typically, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the method steps.

The methods and devices according to the present disclosure may provide a large number of advantages over known methods and devices for multiple transition monitoring. Thus, specifically, superimposing the supplementary AC voltage on top of the AC and DC voltages may result in that the quadrupole mass analyzer gets less prone to small fluctuations such as by slight variation of electronics or mass axis. Measuring MRMs with the method according to the present disclosure may reduce errors yielding in more stable and/or reliable area and/or area ratios. Compared to the implementation of better resolving electronics the proposed solution can be implemented rather cost-effective and simple. The method may be implemented using additional components which can be turned off if necessary, for example for a full scan mode. The proposed method can be used during measurement and thus is time neutral and universally applicable for all MRMs.

Summarizing and without excluding further possible embodiments, the following embodiments may be envisaged:

Embodiment 1: A method for multiple transition monitoring of at least one analyte in a sample using a quadrupole mass analyzer, the method comprising the following steps:

a) at least one voltage application step, wherein in the voltage application step a direct current (DC) voltage and a radio frequency (AC) voltage are applied between two pairs of electrodes of at least one mass filter of the quadrupole mass analyzer, wherein the AC voltage has an amplitude $V_{AC}$ and the DC voltage has an applicable voltage $V_{DC}$, wherein a supplementary AC voltage is superimposed on top of the AC and the DC voltage, wherein an amplitude $\Delta V_{DC}$ of the supplementary AC voltage is $$\leq \frac{V_{DC,max}}{2^{b+1}},$$

wherein $V_{DC,max}$ is a maximum voltage output of the DC voltage and b is a bit size of at least one electronics board of the mass filter of the quadrupole mass analyzer;

b) at least one measurement step, wherein at least one transition of the analyte is determined with at least one detector of the quadrupole mass analyzer.

Embodiment 2: The method according to the preceding embodiment, wherein the supplementary AC voltage is a triangular signal or a sinusoidal signal.

Embodiment 3: The method according to the preceding embodiment, wherein the supplementary AC voltage is a sinusoidal signal, wherein the method comprises applying a pre-determined and/or a pre-defined weighting to the supplementary AC voltage and/or weighting of measurement data determined in step b).

Embodiment 4: The method according to any one of the preceding embodiments, wherein supplementary AC voltage has a frequency v of $$v = \frac{n}{t_d},$$

wherein n is me number or repetitions and $t_d$ is the dwell time, wherein the frequency v is ≤15 kHz.

Embodiment 5: The method according to any one of the preceding embodiments, wherein the AC voltage $V_{AC}$ superimposed with the supplementary AC voltage is $$V_{AC} = V_{AC,max}\frac{m}{z} + c_{AC} + \Delta V_{DC}\cos(2\pi v),$$

wherein $V_{AC,max}$ is a maximum amplitude of the AC voltage, $c_{AC}$ is a constant and m/z is the mass to charge ratio.

Embodiment 6: The method according to any one of the preceding embodiments, wherein the DC voltage $V_{DC}$ superimposed with the supplementary AC voltage is $$V_{DC} = a\left(V_{AC,max}\frac{m}{z} + c_{AC} + \Delta V_{DC}\cos(2\pi v)\right),$$

wherein a is a constant with $$\frac{V_{DC}}{V_{AC}} = a,$$

$V_{AC,max}$ is a maximum amplitude of the AC voltage, CAC is a constant and m/z is the mass to charge ratio.

Embodiment 7: The method according to any one of the preceding embodiments, wherein the method steps a) and b) are performed by using at least one computer.

Embodiment 8: A quadrupole mass analyzer for multiple transition monitoring of at least one analyte in a sample comprising:

at least one mass filter comprising two pairs of electrodes and at least detector configured for determining at least one transition of the analyte, wherein the mass filter further comprises at least one electronics board;

at least one DC voltage generator configured for generating a direct (DC) voltage and at least one AC voltage generator configured for generating a radio frequency (AC) voltage, wherein the AC voltage has an amplitude $V_{AC}$ and the DC voltage has an applicable voltage $V_{DC}$;

at least one power supply circuitry configured for applying the DC voltage and the AC voltage between the two pairs of electrodes of the mass filter;

at least one supplementary AC voltage generator configured for generating a supplementary AC voltage having an amplitude $$\Delta V_{DC} \leq \frac{V_{DC,max}}{2^{b+1}},$$

wherein $V_{DC,max}$ is a maximum voltage output of the DC voltage and b is a bit size of the electronics board of the mass filter of the quadrupole mass analyzer;

at least one supplementary power supply circuitry configured for superimposing the supplementary AC voltage on top of the AC and DC voltages.

Embodiment 9: The quadrupole mass analyzer according to the preceding embodiment, wherein the quadrupole mass analyzer comprises at least one control unit configured for controlling one or more of the DC voltage, the AC voltage, and the supplementary AC voltage.

Embodiment 10: The quadrupole mass analyzer according to any one of the preceding embodiments referring to a quadrupole mass analyzer, wherein the supplementary power supply circuitry comprises one or more of at least one capacitor, at least one operational amplifier.

Embodiment 11: The quadrupole mass analyzer according to any one of the preceding embodiments referring to a quadrupole mass analyzer, wherein the supplementary power supply circuitry is electrically connected with the power supply circuitry.

Embodiment 12: The quadrupole mass analyzer according to any one of the preceding embodiments referring to a quadrupole mass analyzer, wherein the supplementary AC voltage is superimposed on top of the AC and DC voltages by feeding the supplementary AC voltage into the power supply circuitry before applying the DC voltage and AC voltage to the electrodes of the mass filter.

Embodiment 13: The quadrupole mass analyzer according to any one of the preceding embodiments referring to a quadrupole mass analyzer, wherein the supplementary AC voltage is superimposed on top of the AC and DC voltages by feeding the AC and DC voltages together with the supplementary AC voltage into the power supply circuitry.

Embodiment 14: The quadrupole mass analyzer according to any one of the preceding embodiments referring to a quadrupole mass analyzer, wherein the quadrupole mass analyzer comprises at least one evaluation device configured for evaluating at least one detector signal of the detector for determining the transition of the analyte.

Embodiment 15: The quadrupole mass analyzer according to any one of the preceding embodiments referring to a quadrupole mass analyzer, wherein the quadrupole mass analyzer is configured to perform the method according to any one of the preceding embodiments referring to a method.

In order that the embodiments of the present disclosure may be more readily understood, reference is made to the following examples, which are intended to illustrate the disclosure, but not limit the scope thereof.

FIG. 1 shows a flow chart of a method for multiple transition monitoring of at least one analyte in a sample using a quadrupole mass analyzer 110 according to the present disclosure. The sample may be an arbitrary test sample such as a biological sample and/or an internal standard sample. The sample may comprise one or more analytes of interest. For example, the test sample may be selected from the group consisting of: a physiological fluid, including blood, serum, plasma, saliva, ocular lens fluid, cerebral spinal fluid, sweat, urine, milk, ascites fluid, mucous, synovial fluid, peritoneal fluid, amniotic fluid, tissue, cells or the like. The sample may be used directly as obtained from the respective source or may be subject of a pretreatment and/or sample preparation workflow. For example, the sample may be pretreated by adding an internal standard and/or by being diluted with another solution and/or by having being mixed with reagents or the like. For example, analytes of interest may be vitamin D, drugs of abuse, therapeutic drugs, hormones, and metabolites in general. The internal standard sample may be a sample comprising at least one internal standard substance with a known concentration. For further details with respect to the sample, reference is made e.g., to EP 3 425 369 A1, the full disclosure is included herewith by reference. Other analytes of interest are possible.

The method comprises the following steps that, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

a) at least one voltage application step 112, wherein in the voltage application step 112 a direct current (DC) voltage and a radio frequency (AC) voltage are applied between two pairs of electrodes 114 of at least one mass filter 116 of the quadrupole mass analyzer 110, wherein the AC voltage has an amplitude $V_{AC}$ and the DC voltage has an applicable voltage $V_{DC}$, wherein a supplementary AC voltage is superimposed on top of the AC and the DC voltage, wherein an amplitude $\Delta V_{DC}$ of the supplementary AC voltage is $$\leq \frac{V_{DC,max}}{2^{b+1}},$$

wherein $V_{DC,max}$ is a maximum voltage output of the DC voltage and b is a bit size of at least one electronics board 118 of the mass filter 116 of the quadrupole mass analyzer 110;

b) at least one measurement step 122, wherein at least one transition of the analyte is determined with at least one detector 120 of the quadrupole mass analyzer 110.

The DC voltage may be a component of a potential applied to the pair of electrodes 114 which is within a measurement time of a certain m/z value essentially time independent. The AC voltage may be a component of the potential applied to the pair of electrodes 114 periodically changing direction. The AC voltage has an amplitude $V_{AC}$ and the DC voltage has an applicable voltage $V_{DC}$ which are applied to the electrodes 114 of the mass filter 116. The amplitude of the AC voltage $V_{AC}$ can be described as $$V_{AC} = V_{AC,max}\frac{m}{z} + c_{AC},$$

wherein $V_{AC,max}$ is a maximum amplitude of the AC voltage which is applied and/or supplied and/or provided to the electrodes 114 of the mass filter, $c_{AC}$ is a constant and m/z is the mass-to-charge ratio. The AC signal may be a radio frequency signal having a frequency in a range from 3 kHz to 300 GHz. The applicable voltage $V_{DC}$ can be described as $$V_{DC} = V_{DC,max}\frac{m}{z} + c_{DC},$$

wherein $V_{DC,max}$ md is a maximum voltage of the DC voltage, $c_{DC}$ is a constant and m/z is the mass-to-charge ratio. With respect to further embodiments of the AC and DC voltage applied to the electrodes, reference is made to U.S. Pat. No. 5,227,629 the content of which is included by reference herewith.

Generally, it is known that a further AC voltage in addition to AC and DC components has certain effects on a measurement with a quadrupole mass spectrometer or a quadrupole mass filter. For example, U.S. Pat. No. 5,227,629 A describes using a small AC voltage in addition to AC and DC components of the quadrupole, in particular in order to avoid or compensate for manufacturing tolerances. Moreover, it is described therein that this additional small AC voltage may result in instable trajectories of ions. However, the present disclosure proposes using a supplementary AC voltage in order to enhance robustness against drifts and/or shifts of mass axis, in particular for multiple transition monitoring.

The supplementary AC voltage may be an additional AC voltage applied on top of both of the DC and AC voltages. The supplementary AC voltage may be a triangular signal or a sinusoidal signal. In case of applying a triangular supplementary AC voltage all resulting data points of the mass spectrum may have identical weights. However, applying a sinusoidal signal may introduce weighting of data points. In order to compensate for this effect, the method may comprise applying a pre-determined and/or a pre-defined weighting to the supplementary AC voltage and/or a weighting of measurement data.

The supplementary AC voltage may have a frequency different from frequency of the AC voltage. The supplementary AC voltage may have a frequency v of $$v = \frac{n}{t_d},$$

wherein n is the number of repetitions and $t_d$ is the dwell time. For example, for typical dwell times of 2 ms at least 30 repetitions may be used resulting in a frequency v of 15 kHz.

The supplementary AC voltage may be a small waive, i.e., having small amplitude compared to the amplitude of the AC voltage. It was surprisingly found that superimposing a small wave on top of the AC and DC voltages the measured data gets smoothed, in particular averaged, during the measurement and thus less dependent on the step size. For example, well controlled small fluctuations are applied by the supplementary AC voltage. The electronics board 118 of the mass filter 116 may be configured for providing the AC and DC voltages to the mass filter 116, such as to the electrodes 114 of the mass filter 116. The electronics board 118 may comprise at least one digital-to-analog converter. The digital-to-analog converter may be configured for converting a continuously applied voltage signal, such as from a power supply, e.g., from AC and DC voltage generators, into at least one discrete voltage signal. For measuring ions of different m/z values DC and AC voltage values may be adjusted over time such that ions with different m/z values can be transmitted to the detector. For operating the mass filter 116 the AC and DC voltages may be adjusted such that the mass filter is passable or open for the desired mass. The selectable masses cannot be selected continuously but only in discrete steps since the digital-to-analog converter may divide the voltage range in b discrete steps, wherein b is also denoted as bit size. In particular, the bit size may refer to the total number of bits. This has the effect that the observable mass range is divided in b steps, too, wherein the greater the number of steps (bits) of the digital-to-analog converter the finer the m/z-steps in the mass range. For a given voltage a certain mass can be filtered, in particular selected, by the mass filter 116 and is transmitted to the detector 120. The detector 120 may determine intensity, in particular frequency, of the impinging ions. Detected intensity may depend on the dwell time and difference between real mass of the ion and filtered mass. The filtered mass may be displaced in particular due to variations in temperature. Because of the discretization of the mass filter the displacement may not be visible as a continuous change but as a jump in intensity. The supplementary AC voltage may have a maximal amplitude of the range of a width of a bin of the mass spectrum. The amplitude $\Delta V_{DC}$ of the supplementary AC voltage is $$\leq \frac{V_{DC,max}}{2^{b+1}},$$

wherein $V_{DC,max}$ is a maximum voltage output of the DC voltage and b is a bit size of the electronics board 118 of the mass filter 116 of the quadrupole mass analyzer 110. The bit size may be a number of bits provided by the digital-to-analog converter. As outlined above, because of the discretization of the mass filter 116 the displacement of the filtered mass may be observable as a jump in intensity. It was surprisingly found that a smoothing effect can be achieved in case the amplitude of the supplementary AC voltage is below a bin size of the mass filter 116. The bin width may be a resolution limit at which m/z values can be adjusted. For determining resulting intensities of pixels of the mass spectrum, detected signals within a certain m/z range may be integrated. Intensity values of signals may be added up for a pixel of the mass spectrum if they belong to the same bin.

The bin width may depend or may be selected depending on the number of bits that are available to discretize the total mass range. The bin width Δ(m/z) may be defined by $$\Delta\left(\frac{m}{z}\right) = \frac{\text{mass range}}{2^b},$$

wherein the mass range is the possible mass range, in particular total mass range, for the applied DC voltage and b is the bit size of the electronics board 118 of the mass filter 116 of the quadrupole mass analyzer 110. The amplitude $V_{DC}$ of the supplementary AC voltage may be $$\Delta V_{DC} \leq \frac{V_{DC,max}}{\text{mass range}}\frac{\frac{\Delta m}{z}}{2} = \frac{V_{DC,max}}{\text{mass range}}\frac{\text{mass range}}{2^{b+1}} = \frac{V_{DC,max}}{2^{b+1}}.$$

The AC voltage $V_{AC}$ superimposed with the supplementary AC voltage may be $$V_{AC} = V_{AC,max}\frac{m}{z} + c_{AC} + \Delta V_{DC}\cos(2\pi v),$$

wherein $V_{AC,max}$ is a maximum amplitude of the AC voltage, $c_{AC}$ is a constant and m/z is the mass to charge ratio. The DC voltage $V_{DC}$ superimposed with the supplementary AC voltage may be $$V_{DC} = a\left(V_{AC,max}\frac{m}{z} + c_{AC} + \Delta V_{DC}\cos(2\pi v)\right),$$

wherein a is a constant with $$\frac{V_{DC}}{V_{AC}} = a$$

(Mathieu equation), $V_{AC,max}$ is the maximum amplitude of the AC voltage, $c_{AC}$ is a constant and m/z is the mass-to-charge ratio.

Superimposing the supplementary AC voltage on top of the AC and DC voltages may result in that the quadrupole mass analyzer 110 gets less prone to small fluctuations such as by slight variation of electronics or mass axis. Measuring MRMs with the method according to the present disclosure may reduce errors yielding in more stable and/or reliable area and/or area ratios. Compared to the implementation of better resolving electronics the proposed solution can be implemented rather cost-effective and simple. The method may be implemented using additional components which can be turned off if necessary, for example for a full scan mode. The proposed method can be used during measurement and thus is time neutral and universally applicable for all MRMs.

The method comprises the at least one measurement step 122, wherein at least one transition of the analyte is determined with the detector 120 of the quadrupole mass analyzer 110. The measurement step 122 may be triggered by a user, e.g., by entering at least one input to at least one human-machine-interface of the quadrupole mass analyzer 110. The method may comprise detecting the ions having passed the mass filter 116 with the detector 120. The method may comprise evaluating data recorded with the detector. The evaluating may comprise determining the mass spectrum. The evaluating may comprise identifying the analyte, such as by correlating known masses to the identified masses or through a characteristic fragmentation pattern. The evaluation may be performed using the at least one evaluation device 124. The evaluating may comprise performing at least one data analysis comprising performing at least one peak finding algorithm and/or performing at least one peak fitting algorithm. The evaluating may comprise one or more of preprocessing, smoothening, background reduction or removal, peak detection, peak integration.

The method steps a) and b) may be performed by using at least one computer. Specifically, controlling of the voltage application in step a) may be performed fully automatically. Moreover, data acquisition and evaluation in step b) may be performed fully automatically. The method specifically may fully or partially be computer-implemented, specifically on a computer of the quadrupole mass analyzer, such as a processor.

Figure 2:
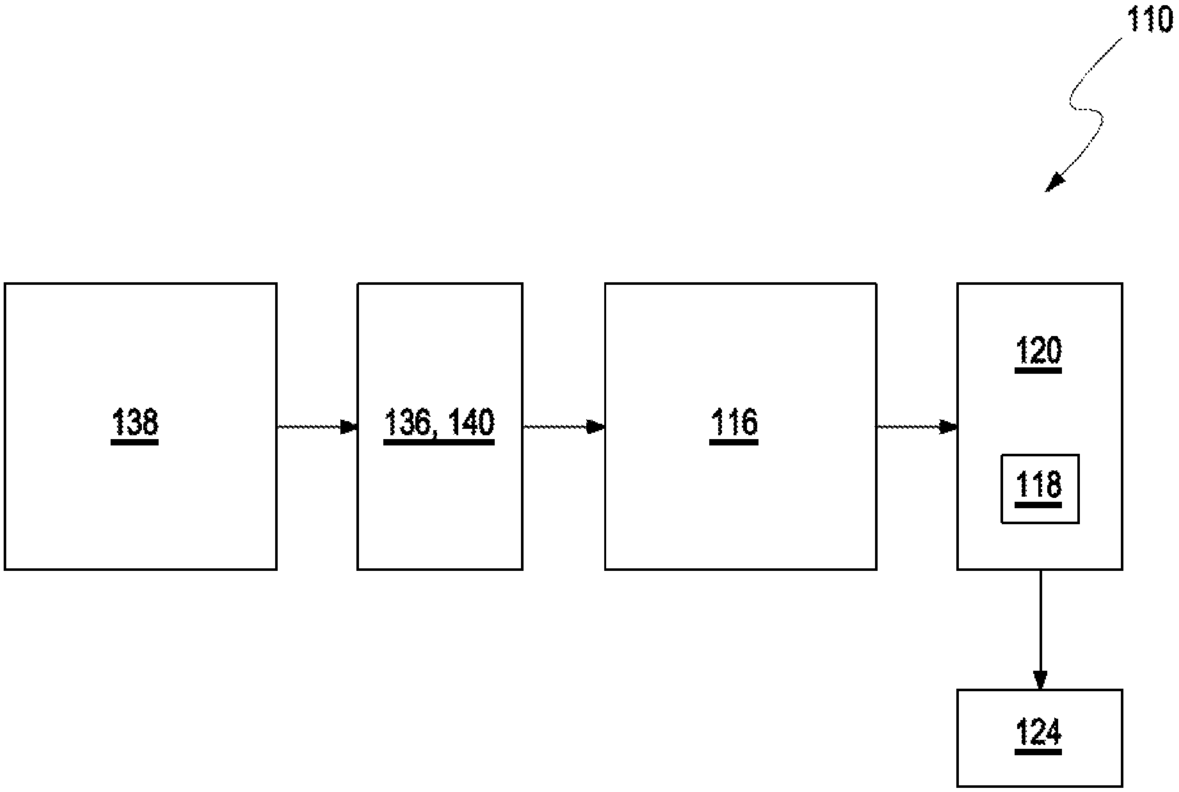
FIG. 2 shows a schematic embodiment of a quadrupole mass analyzer according to the present disclosure.
Figure 5:
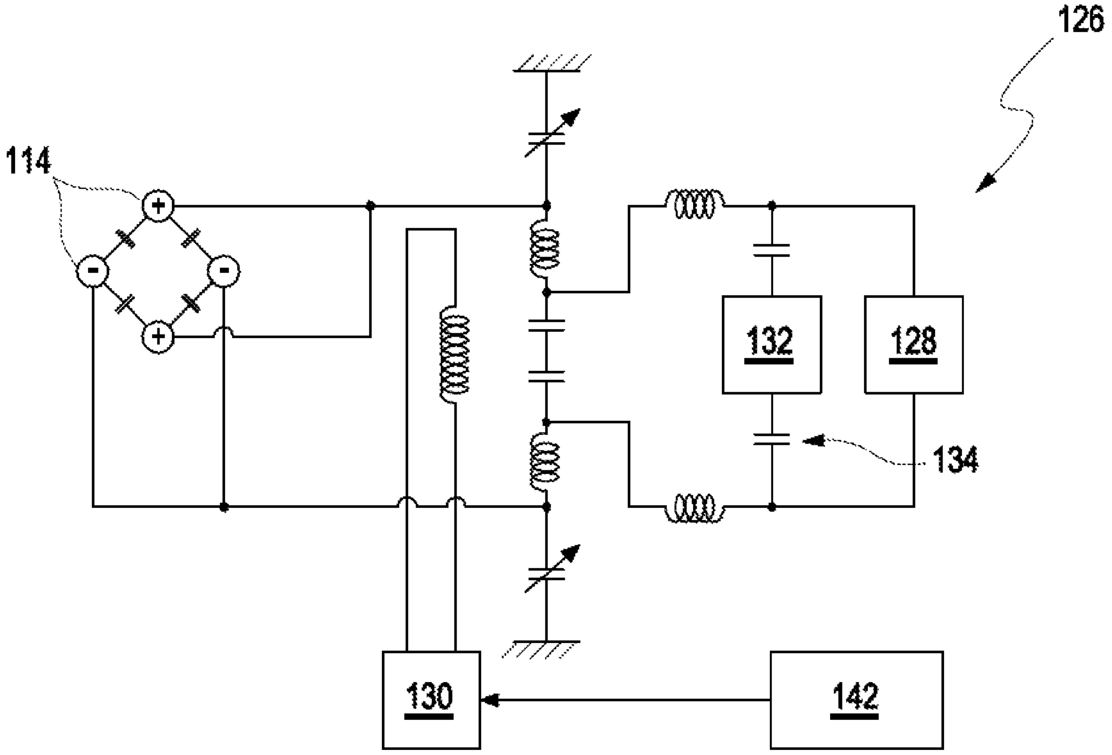
FIG. 5 shows an embodiment of power supply circuitry according to the present disclosure.

FIG. 2 shows a schematic embodiment of the quadrupole mass analyzer 110. The quadrupole mass analyzer 110 comprises the at least one mass filter 116 comprising two pairs of electrodes 114 and the at least detector 120 configured for determining at least one transition of the analyte. The quadrupole mass analyzer 110 may be an analyzer configured for detecting at least one analyte based on mass-to-charge ratio. The quadrupole mass analyzer 110 may comprise at least one quadrupole as mass filter 116. The quadrupole mass analyzer 110 may comprise a plurality of quadrupoles. For example, the quadrupole mass analyzer 110 may be a triple quadrupole mass spectrometer. The mass filter 116 may be configured for selecting ions injected to the mass filter 116 according to their mass-to-charge ratio m/z. The mass filter 116 comprises two pairs of electrodes 114. The electrodes 114 may be rod-shaped, in particular cylindrical. The electrodes 114 may be designed identical. The electrodes 114 may be arranged in parallel extending along a common axis, e.g., a z axis. The quadrupole mass analyzer 110 comprises at least one power supply circuitry 126 configured for applying at least one direct current (DC) voltage and at least one alternating current (AC) voltage between the two pairs of electrodes 114 of the mass filter 116. An embodiment of the power supply circuitry 126 is shown in FIG. 5. The design of the power supply circuitry 126 corresponds to the construction of the mass spectrometer of FIG. 1 of U.S. Pat. No. 5,227,629 A, however, according to the present disclosure may be designed for multiple transition monitoring. The power supply circuitry 126 may be configured for holding each opposing electrode pair 114 at identical potential. The power supply circuitry 126 may be configured for changing sign of charge of the electrode pairs 114 periodically such that stable trajectories are only possible for ions within a certain mass-to-charge ratio m/z. Trajectories of ions within the mass filter can be described by the Mathieu differential equations. For measuring ions of different m/z values DC and AC voltage may be changed over time, in particular at a ratio $$\frac{V_{DC}}{V_{AC}} = a,$$

such mat ions with different m/z values can be transmitted to the detector 120.

The quadrupole mass analyzer 110 may further be connected to and/or may comprise a sample preparation station, not shown here, for the automated pre-treatment and preparation of samples each comprising at least one analyte of interest.

The quadrupole mass analyzer comprises at least one DC voltage generator 128 configured for generating the direct voltage and at least one AC voltage generator 130 configured for generating the radio frequency AC voltage. The DC voltage generator 128 may be configured to adapt the DC voltage signal depending on the m/z range which shall be measured. The AC voltage generator 130 may comprise at least one frequency generator. The power supply circuitry 126 may be at least one electronic circuit connecting the DC voltage generator 128 and the AC voltage generator 130 to the electrode 114 pair of the mass filter 116. The power supply circuitry 126 may comprise a plurality of power lines and/or further electrical devices and components.

The quadrupole mass analyzer comprises at least one supplementary AC voltage generator 132 configured for generating the supplementary AC voltage having the amplitude $\Delta V_{DC} \leq V_{DC,max}/2^{b+1}$, wherein $V_{DC,max}$ is a maximum voltage output of the DC voltage and b is a bit size of the electronics board 118 of the mass filter 116. The quadrupole mass analyzer 110 comprises at least one supplementary power supply circuitry 134 configured for superimposing the supplementary AC voltage on top of the AC and DC voltages. The superimposing of the AC and DC voltages with the supplementary AC voltage is performed by using the at least one supplementary power supply circuitry 134. The supplementary power supply circuitry 134 may be electrically connected with the power supply circuitry 126. The supplementary AC voltage may be superimposed on top of the AC and DC voltages by feeding the supplementary AC voltage into the power supply circuitry 126 before applying the DC voltage and AC voltage to the electrodes 114 of the mass filter 116. The supplementary AC voltage may be superimposed on top of the AC and DC voltages by feeding the AC and DC voltages together with the supplementary AC voltage into the power supply circuitry 126. For example, the supplementary AC voltage generator 132 may be embodied integral to one or both of the AC and DC voltage generators 130, 128. For example, the quadrupole mass analyzer 110 may comprise two supplementary AC voltage generators 132. For example, one of the supplementary AC voltage generators 132 may be embodied integral to the AC voltage generator 130 and the other one may be embodied to the DC voltage generator 128. In case the supplementary AC voltage generator 132 is embodied integral to one or both of the AC and DC voltage generators 130, 128, the AC and/or DC voltage signal may be superimposed directly during or after generation with the supplementary AC voltage and may be fed together within the power supply circuitry 126.

The superimposing may be embodied capacitive, resulting in a sinusoidal signal, or by using at least one operational amplifier, resulting in a triangular wave. The supplementary power supply circuitry 134 may comprise one or more of at least one capacitor, at least one operational amplifier. The supplementary power supply circuitry 134 may be implemented using electronic components in addition to existing and known power supply circuitry for quadrupole mass analyzers. These additional components can be turned off if necessary, for example for a full scan mode.

The quadrupole mass analyzer 110 comprises at least one detector 120. The detector 120 may be configured for detecting charged particles. The detector 120 may be or may comprise at least one electron multiplier. The detector 120 and/or at least one evaluation device 124 of the quadrupole mass analyzer 110 may be configured to determining at least one mass spectrum of the detected ions. The mass spectrum may be a pixelated image. For determining resulting intensities of pixels of the mass spectrum, signals detected with the detector within a certain m/z range may be integrated. The analyte in the sample may be identified by the at least one evaluation device 124. Specifically, the evaluation device may be configured for correlating known masses to the identified masses or through a characteristic fragmentation pattern.

The quadrupole mass analyzer may comprise the at least one evaluation device 124 configured for evaluating at least one detector signal of the detector 120 for determining the transition of the analyte. The at least one evaluation device 124 may comprise at least one data processing device having a software code stored thereon comprising a number of computer commands. The evaluation device 124 may provide one or more hardware elements for performing one or more of the named operations and/or may provide one or more processors with software running thereon for performing one or more of the method steps.

The quadrupole mass analyzer 110 may comprise at least one control unit 142 configured for controlling one or more of the DC voltage, the AC voltage, and the supplementary AC voltage. The control unit may comprise an electronic and/or logic unit configured to control operation of the one or more of the DC voltage, the AC voltage, and the supplementary AC voltage, in particular output signals of one or more of the AC, the DC and supplementary AC voltage generators 130, 128 and/or power supply circuitry 126 and/or supplementary power supply circuitry 134.

The quadrupole mass analyzer 110 may further comprise at least one ionization source 136. The ionization source 136 may be or may comprise at least one source selected from the group consisting of: at least one gas phase ionization source such as at least one electron impact (EI) source or at least one chemical ionization (CI) source; at least one desorption ionization source such as at least one plasma desorption (PDMS) source, at least one fast atom bombardment (FAB) source, at least one secondary ion mass spectrometry (SIMS) source, at least one laser desorption (LDMS) source, and at least one matrix assisted laser desorption (MALDI) source; at least one spray ionization source such as at least one thermospray (TSP) source, at least one atmospheric pressure chemical ionization (APCI) source, at least one electrospray (ESI), and at least one atmospheric pressure ionization (API) source.

The quadrupole mass analyzer 110 may be or may comprise a liquid chromatography mass spectrometry device. The quadrupole mass analyzer 110 may be connected to and/or may comprise at least one liquid chromatograph 138. The liquid chromatograph 138 may be used as sample preparation for the quadrupole mass analyzer 110. Other embodiments of sample preparation may be possible, such as at least one gas chromatograph. The liquid chromatography mass spectrometry device may be or may comprise at least one high-performance liquid chromatography (HPLC) device or at least one micro liquid chromatography (AC) device. The liquid chromatography mass spectrometry device may comprise a liquid chromatography (LC) device 138 and a mass spectrometry (MS) device, in the present case the mass filter 116, wherein the LC device 138 and the mass filter 116 are coupled via at least one interface 140. The interface 140 coupling the LC device 138 and the MS device may comprise the ionization source 136 configured for generating of molecular ions and for transferring of the molecular ions into the gas phase. The interface 140 may further comprise at least one ion mobility module arranged between the ionization source 136 and the mass filter 116. For example, the ion mobility module may be a high-field asymmetric waveform ion mobility spectrometry (FAIMS) module. The liquid chromatography mass spectrometry device may further comprise a sample preparation station for the automated pre-treatment and preparation of samples each comprising at least one analyte of interest.

Figure 3A:
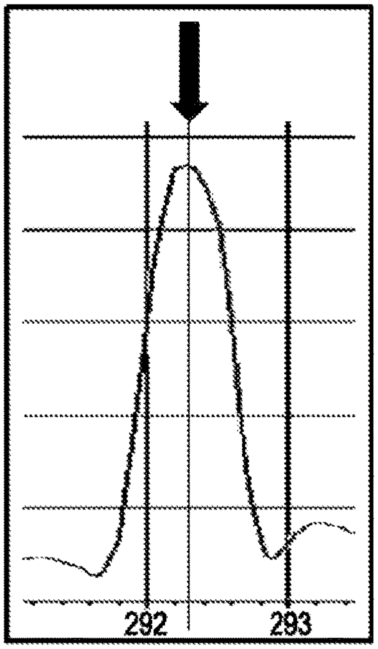
FIGS. 3A to 3C show a visualization of MRM measurement with superimposed supplementary AC voltage.
Figure 3B:
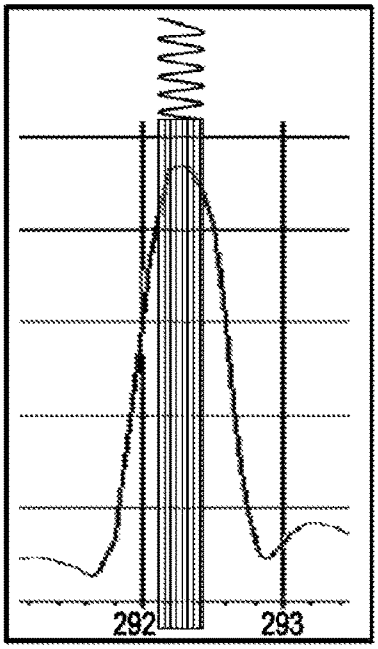
Figure 3C:
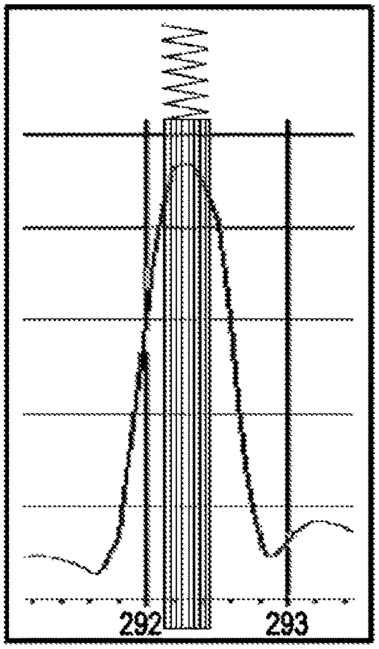

FIGS. 3A to C show a visualization of MRM measurement with superimposed supplementary AC voltage. FIG. 3A shows a conventional MRM measurement. The bin having a local maximum is denoted with a solid line and an arrow. For this bin a single data point for the corresponding DC voltage was recorded by the detector 120. FIG. 3B shows an MRM measurement according to the present disclosure with a sinusoidal signal as supplementary voltage. FIG. 3C shows an MRM measurement according to the present disclosure with a triangle signal as supplementary voltage. In this visualization the amplitude is exaggerated. The superimposing of the supplementary voltage may result in that a plurality of data points are recorded for the same bin such that smoothing or averaging is possible when generating the bin of the mass spectrum.

Figure 4:
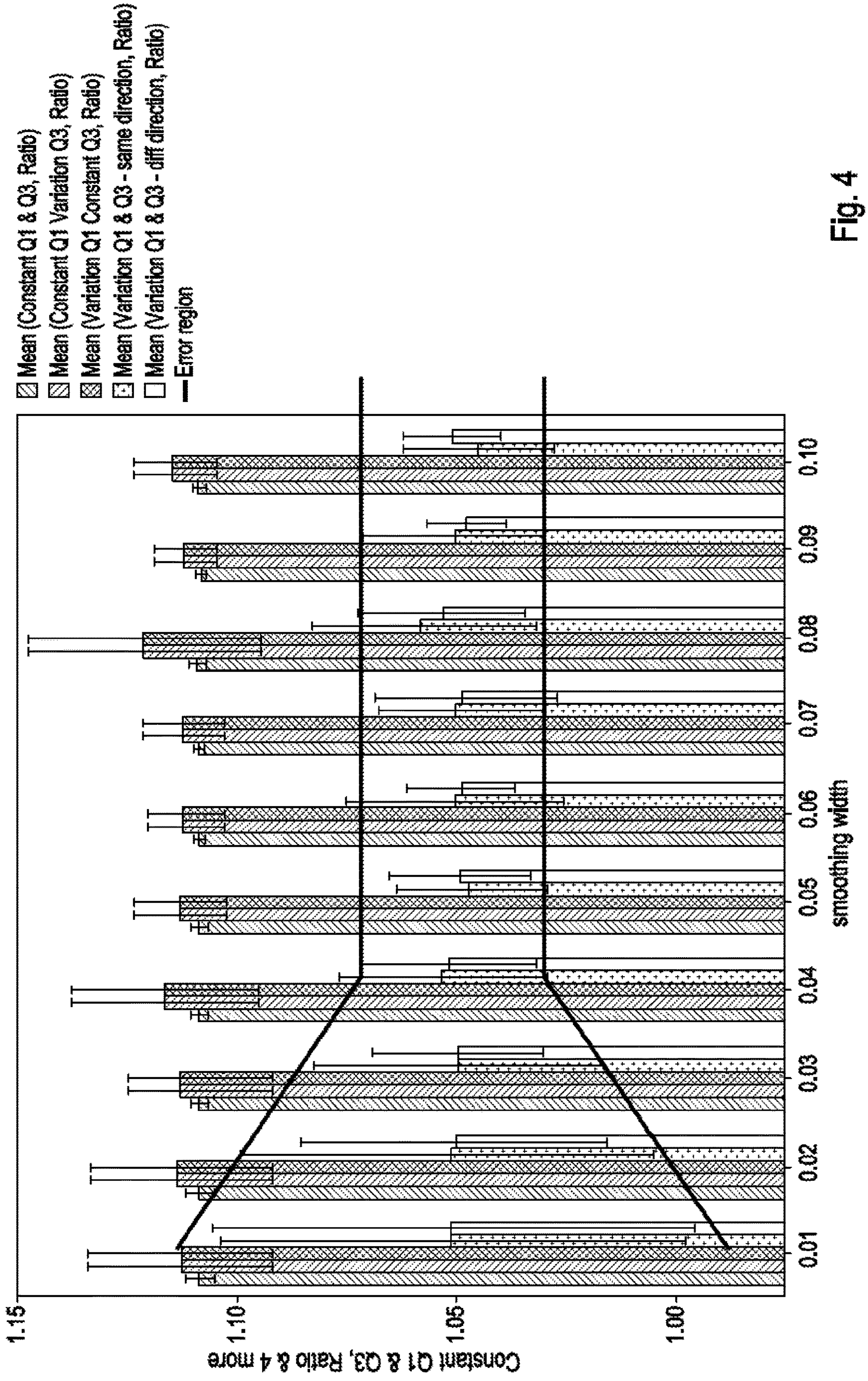
FIG. 4 shows results of simulating the effect of signal averaging.

FIG. 4 shows results of simulating an effect of signal averaging. Smoothing of different strength is applied to the data. Specifically, FIG. 4 shows a bar chart for different smoothing width, i.e., from 0.01 to 0.10, wherein from left to right of each bin of smoothing width, the first bar refers to the mean for constant Q1 and Q3, the second bar refers to the mean for constant Q1 and varied Q3, the third bar refers to the mean for varied Q1 and constant Q3, the fourth bar refers to the mean for Q1 and Q3 varied in the same direction, and the fifth bar refers to the mean for Q1 and Q3 varied in different directions. Q1 and Q3 refer to quadrupoles of the quadrupole mass analyzer 110. Filtering is only effective when the smoothing width is below the bin size, in this embodiment 0.05 u. In addition, FIG. 4 shows with solid lines an error region. On the left side of FIG. 4 an opening width of the error region refers to the error without smoothing and on the right side of FIG. 4 an opening width of the error region refers to the error with smoothing. The error gets reduced significantly by the smoothing yielding in more stable and/or reliable area/area ratios.

LIST OF REFERENCE NUMBERS

110 Quadrupole mass analyzer
112 voltage application step
114 electrodes
116 mass filter
118 electronics board
120 Detector
122 measurement step
124 evaluation device
126 power supply circuitry
128 DC voltage generator
130 AC voltage generator
132 supplementary AC voltage generator
134 supplementary power supply circuitry
136 ionization source
138 liquid chromatography device
140 interface
142 control unit

What is claimed is:

1. A method for multiple transition monitoring of at least one analyte in a sample using a quadrupole mass analyzer, the method comprising the following steps:

a) at least one voltage application step, wherein in the voltage application step a direct current (DC) voltage and a radio frequency (AC) voltage are applied between two pairs of electrodes of at least one mass filter of the quadrupole mass analyzer, wherein the AC voltage has an amplitude VAC and the DC voltage has an applicable voltage VDC, wherein a supplementary AC voltage is superimposed on top of the AC and the DC voltage, wherein an amplitude ΔVDC of the supplementary AC voltage is $$\leq \frac{V_{DC,max}}{2^{b+1}},$$

wherein VDC,max is a maximum voltage output of the DC voltage and b is a bit size of at least one electronics board of the mass filter of the quadrupole mass analyzer, wherein the electronics board is configured for providing the AC and DC voltages to the electrodes of the mass filter, wherein the electronics board comprises at least one digital-to-analog converter;

b) at least one measurement step, wherein at least one transition of the analyte is determined with at least one detector of the quadrupole mass analyzer.

2. The method according to claim 1, wherein the supplementary AC voltage is a triangular signal or a sinusoidal signal.

3. The method according to claim 2, wherein the supplementary AC voltage is a sinusoidal signal, wherein the method comprises one or both of applying one or both of a pre-determined or a pre-defined weighting to the supplementary AC voltage or weighting of measurement data determined in step b).

4. The method according to claim 1, wherein supplementary AC voltage has a frequency v of $$v = \frac{n}{t_d},$$

wherein n is the number of repetitions and td is the dwell time, wherein the frequency v is ≤15 kHz.

5. The method according to claim 1, wherein the AC voltage $V_{AC}$ superimposed with the supplementary AC voltage is $$V_{AC} = V_{AC,max}\frac{m}{z} + c_{AC} + \Delta V_{DC}\cos(2\pi v),$$

wherein $V_{AC,max}$ is a maximum amplitude of the AC voltage, cAC is a machine-specific constant for the quadrupole built into the quadrupole mass analyzer and calculated from a quadrupole rod length, a rod diameter, and a rod distance, m/z is the mass to charge ratio, v is a frequency of the supplementary AC voltage defined by $$v = \frac{n}{t_d},$$

n is the number of repetitions, and td is the dwell time, and wherein the frequency v is ≤15 kHz.

6. The method according to claim 1, wherein the method steps a) and b) are performed by using at least one computer.

7. A quadrupole mass analyzer for multiple transition monitoring of at least one analyte in a sample comprising:

at least one mass filter comprising two pairs of electrodes and at least one detector configured for determining at least one transition of the analyte, wherein the mass filter further comprises at least one electronics board, wherein the electronics board is configured for providing the AC and DC voltages to the electrodes of the mass filter, wherein the electronics board comprises at least one digital-to-analog converter;

at least one DC voltage generator configured for generating a direct (DC) voltage and at least one AC voltage generator configured for generating a radio frequency (AC) voltage, wherein the AC voltage has an amplitude VAC and the DC voltage has an applicable voltage VDC;

at least one power supply circuitry configured for applying the DC voltage and the AC voltage between the two pairs of electrodes of the mass filter;

at least one supplementary AC voltage generator configured for generating a supplementary AC voltage having an amplitude $$\Delta VDC \leq \frac{V_{DC,max}}{2^{b+1}}$$

wherein VDC,max is a maximum voltage output of the DC voltage and b is a bit size of the electronics board of the mass filter of the quadrupole mass analyzer;

at least one supplementary power supply circuitry configured for superimposing the supplementary AC voltage on top of the AC and DC voltages.

8. The quadrupole mass analyzer according to claim 7, wherein the quadrupole mass analyzer comprises at least one control unit configured for controlling one or more of the DC voltage, the AC voltage, and the supplementary AC voltage.

9. The quadrupole mass analyzer according to claim 7, wherein the supplementary power supply circuitry comprises one or more of at least one capacitor, at least one operational amplifier.

10. The quadrupole mass analyzer according to claim 7, wherein the supplementary power supply circuitry is electrically connected with the power supply circuitry.

11. The quadrupole mass analyzer according to claim 7, wherein the supplementary AC voltage is superimposed on top of the AC and DC voltages by feeding the supplementary AC voltage into the power supply circuitry before applying the DC voltage and AC voltage to the electrodes of the mass filter.

12. The quadrupole mass analyzer according to claim 7, wherein the supplementary AC voltage is superimposed on top of the AC and DC voltages by feeding the AC and DC voltages together with the supplementary AC voltage into the power supply circuitry.

13. The quadrupole mass analyzer according to claim 7, wherein the quadrupole mass analyzer comprises at least one evaluation device configured for evaluating at least one detector signal of the detector for determining the transition of the analyte.

* * * * *